United States Patent [19]

Farris et al.

[11] Patent Number: 4,502,044

[45] Date of Patent: Feb. 26, 1985

[54] MOISTURE ALARM SYSTEM

[76] Inventors: James R. Farris; James R. Farris, Jr., both of 225 W. Winter Ave., New Castle, Pa. 16105

[21] Appl. No.: 379,619

[22] Filed: May 19, 1982

[51] Int. Cl.³ .................. G08B 21/00; G01W 1/14
[52] U.S. Cl. .................................... 340/604; 73/171
[58] Field of Search .............. 340/604, 605; 73/171; 331/65

[56] References Cited

U.S. PATENT DOCUMENTS

| | | | |
|---|---|---|---|
| 3,245,068 | 4/1966 | Wegryn et al. | 340/604 |
| 3,758,855 | 9/1973 | Meyer | 340/604 |
| 4,253,064 | 2/1981 | McBride | 331/65 |
| 4,264,901 | 4/1981 | Petersen | 340/604 |
| 4,347,503 | 8/1982 | Uyehara | 340/604 |
| 4,356,479 | 10/1982 | Wilson | 340/604 |

Primary Examiner—James J. Gill
Attorney, Agent, or Firm—Stephen Ross Green

[57] ABSTRACT

This invention is directed to a system for detecting the presence of moisture in a given location such as the attic of a building or house before the moisture has had an opportunity to penetrate plaster walls or cause other damage. The disclosed invention includes a detector for detecting the presence of minute quantities of moisture contemporaneous with their initial appearance, which responds to the presence of moisture by exhibiting a decrease in its internal impedance. An audible signal-generating circuit is coupled to the detector and responds to the resultant decrease in the impedance of the detector by commencing to oscillate at a pre-determined audio frequency. Since it is possible that prior to the discovery of the alarm signal the moisture may have evaporated, which ordinarily might cause the impedance through the detector to return to its normal value and thus terminate the audible signal, there is additionally provided a circuit to sustain the signal for an indefinite period of time even after the evaporation of the moisture which thus permits the discovery of the existence of moisture at a later time.

2 Claims, 1 Drawing Figure

U.S. Patent    Feb. 26, 1985    4,502,044
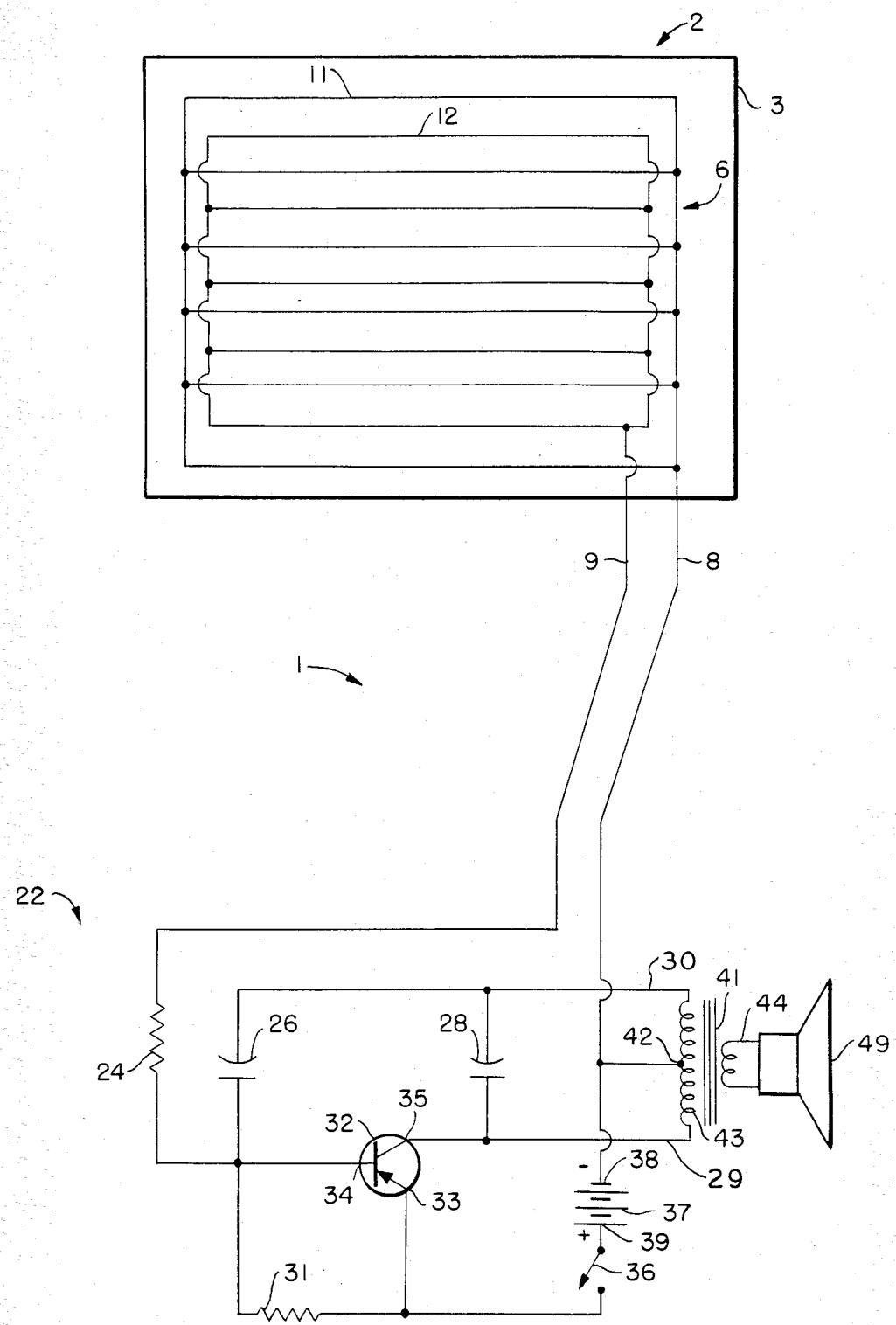

MOISTURE ALARM SYSTEM

This invention relates to a moisture alarm system.

More specifically, a device is disclosed for detecting the presence of minute quantities of moisture contemporaneous with its initial appearance. The disclosed invention includes a detector which responds to the presence of moisture by exhibiting a decrease in its internal impedance. An audible signal-generating circuit is coupled to the detector and responds to the resultant decrease in the impedance of the detector by commencing to oscillate at a pre-determined audio frequency. Since it is possible that prior to the discovery of the alarm signal, the moisture may have evaporated which ordinarily might cause the impedance of the detector to return to its normal value and thus terminate the audible signal, there is additionally provided a circuit to sustain the signal for an indefinite period of time even after the evaporation of the moisture which thus permits the discovery of the existence of moisture at a later time.

DESCRIPTION OF THE PRIOR ART

Numerous devices exist in the prior art which can detect the presence of moisture when it leaks through a roof or seeps through a floor. It is well known in the prior art to employ an electrical oscillating circuit in conjuction with an absorbent grid containing electrical conductors which respond to the presence of moisture wetting the textile or other absorbent cloth of the grid by signaling an audible alarm. As a practical matter, however, just as the devices in the prior art signal the presence of moisture, they include no provision to continue to indicate the presence of moisture and hence they cease to signal the presence of moisture when the moisture is no longer present due to evaporation, for instance. By way of example, if it is desirable to monitor the presence of moisture in the attic of a house, which might have leaked through a roof, and the owner of the house intends to be away for an extended period of time, it is conceivable that a leak might occur in the roof, the alarm device sound, only to cease at a later time due to the evaporation of the moisture after a few days. Meanwhile, the owner of the house is unaware of the leaking condition of the roof since he encounters no alarm signal upon his return, and latent damage to the structural members or plaster portions of the house caused by the moisture may have occurred. The invention to be described more fully hereinafter remedies these deficiencies noted in respect of the prior art, and further includes features not available therein.

It is therefore an object of this invention to provide a moisture alarm system providing an audible signal immediately in the presence of moisture.

A further object of the invention is to provide an alarm system which will continue to signal its alarm even though the moisture initially detected has subsequently evaporated.

Another object is to provide an alarm system which is readily adaptable to a given area desired to be protected from moisture.

Yet another object of the invention is to provide a moisture alarm system which is easily resettable so that upon resetting it is ready once again to detect the presence of moisture.

In attaining the foregoing objects, the invention provides a moisture alarm system which includes a grid having two conductors, the conductors having extensions which are spaced in proximity to one another so that an open circuit normally exists between the two conductors. This grid is mounted upon a sheet of flexible absorbent material such as cloth or other textile fabric, or alternatively the grid may be sandwiched between two such sheets. In this configuration, the grid will exhibit a very high impedance when it is dry, and yet will show a noticeably lower impedance when moisture falls upon the fabric wetting same in the vicinity of the spaced extensions of the conductor, due to the electrical conductivity of the moisture lowering the impedance between the conductor. In addition, the grid can be fabricated on large sheets for ease of installation when large areas are involved. An oscillator circuit is electrically coupled to the grid and responds to any decrease in the impedance of the grid by commencing to oscillate. The oscillator further provides a transistor amplifier having an input and an output. A transducer such as a loud speaker is coupled to the output of the oscillator circuit to convert the electrical oscillations into an audible sound. Coupled to the oscillator circuit is a sustaining circuit which maintains the electrical oscillations and resulting audible sound generated by the oscillator circuit in the event that the moisture wetting the grids subsequently evaporates, thus maintaining the alarm signal even after the moisture initially detected is no longer present.

Other objects and advantages of the present invention will become apparent from the ensuing description of an illustrative embodiment thereof, in the course of which reference is made to the accompanying drawings in which:

FIG. 1 is a schematic representation of a moisture alarm system which includes a grid and an oscillator circuit having a sustaining circuit.

DESCRIPTION OF PREFERRED EMBODIMENT

A clearer understanding of the invention will be obtained if FIG. 1 is studied in conjunction with the description that follows. Referring to FIG. 1, there is shown a moisture alarm system generally indicated by reference numeral 1. Moisture alarm system 1 includes a detector indicated by reference numeral 2. Detector 2 includes a backing sheet 3 which may be fabricated from any porous or fibrous flexible material such as a textile fabric. The purpose of backing sheet 3 is to absorb droplets of moisture and to disburse them insofar as possible due to capillary action within the fibers of backing sheet 3. Hence, it should be obvious that although the preferred embodiment discloses a cloth backing sheet 3, there are any number of materials, both synthetic and natural, which will fulfill these requirements. In addition, it should be appreciated that backing sheet 3 and its attached grid 6 may be manufactured in large rolls which may be cut to the desired size even if unusual shapes or configurations are necessary.

Secured to backing sheet 3 are first extensions indicated generally by reference numeral 11 and second extensions indicated generally by reference numeral 12, the individual extensions of which are shown in FIG. 1 to be interjacently spaced in close proximity to one another on backing sheet 3. First extensions 11 and second extensions 12 are electrically connected to first conductor 8 and second conductor 9 respectively.

At this point, it may be seen that first extensions 11 and second extensions 12 form a grid 6 which would ordinarily exhibit a very high impedance to the flow of electricity. Electrical connection to first extensions 11 and second extensions 12 is provided by way of first conductor 8 and second conductor 9 respectively. The exact pattern of grid 6 is not critical but should be chosen such that backing sheet 3 can be cut or trimmed as may be necessary without leaving areas on grid 6 which have no electrical connection to first conductor 8 or second conductor 9. FIG. 1 illustrates one such pattern but obviously others may be equally applicable. First extensions 11 and second extensions 12 may be seen to be in close proximity to each other on backing sheet 3 and as shown on FIG. 1, generally run parallel to one another, although the spaces between first extensions 11 and second extensions 12 have been exaggerated on FIG. 1 for purposes of illustration. Our experimentation to date has indicated that an interjacent spacing of ¼ to ½ inch between first extensions 11 and second extensions 12 is suitable for most purposes, this being the approximate span of a drop of moisture when absorbed by backing sheet 3. In addition, grid 6 may be "sandwiched" between two such backing sheets 3.

Referring again to FIG. 1, there is provided an oscillator circuit which is generally indicated by reference numeral 22, which is electrically connected to first conductor 8 and second conductor 9 as will be more specifically hereinafter described. Oscillator circuit 22 is a regenerative feedback type of circuit which includes a transistor 32 and a transformer 41. Transistor 32 is a general purpose PNP audio frequency transistor such as a 2N1305 type which has an emitter electrode 33, a base electrode 34, and a collector electrode 35. With appropriate modification, it should be apparent that oscillator circuit 22 may be adapted to include one or more vacuum tubes rather than transistor 32. transformer 41 has a primary winding 43 and a secondary winding 44, and further has a center tap 42 on primary winding 43. The characteristics of transformer 41 are not critical, and transformer 41 may be any audio output transformer commonly used in an audio output stage of a transistorized circuit. Connected across primary winding 43 of transformer 41 is a 0.1 microfarad first capacitor indicated by reference numeral 28. First capacitor 28 and primary winding 43 of transformer 41 form what is commonly referred to as a tuned LC tank circuit which has first side 29 and second side 30 and which should be well known to those skilled in the art as having a pre-determined resonant frequency. First capacitor 28 and primary winding 43 are selected so that the tuned LC tank circuit has a resonant frequency within the audio frequency range which of course is determined by the capacitance of first capacitor 28 and the inductance of the primary winding 43 of transformer 41. It should be obvious to those skilled in the art that a number of combinations of first capacitor 28 and transformer 41 are possible so long as the LC tank circuit is able to resonate at an appropriate frequency within the audio spectrum. First side 29 of the LC tank circuit is connected to collector electrode 35 of transistor 32. First conductor 8 of grid 6 is connected to center tap 42 of transformer 41. Electrical power is furnished by power supply 37 which may be any 9-volt direct current power source having a negative terminal 38 and a positive terminal 39 and may include such commonly available power sources as a 9-volt battery, or a 9-volt direct current power source derived from household current. Negative terminal 38 of power supply 37 is also connected to center tap 42 of transformer 41, and positive terminal 39 of power supply 37 is connected serially through switch 36 to the emitter electrode 33 of transistor 32. Switch 36 is a single pole, single throw switch which can interrupt the flow of current from power supply 37 and when opened, serves to disable the alarm circuit after it has begun to oscillate as will be more specifically described hereinafter. Those skilled in the art will recognize this configuration in which emitter electrode 33 is connected to positive terminal 39 of power supply 37 through switch 36 as a common emitter amplifier, providing an input to base electrode 34 and an output from collector electrode. 35 with emitter electrode 33 being a common connection.

Second conductor 9 of detector 2 is serially connected through first resistor 24, which is a 4.7 k resistor, to base electrode 34 of transistor 32. Likewise, second resistor 31, a 2.2 k resistor, is connected between emitter electrode 33 and base electrode 34 of transistor 32. Finally, second capacitor 26, a 0.022 microfarad capacitor, is connected between second side 30 of the LC tank circuit and base electrode 34 of transistor 32 and serves to block the flow of direct current from power supply 37 prior to the commencement of oscillating and yet feed back a portion of the oscillations in the LC tank circuit to base electrode 34 of transistor 32 once oscillation has commenced, due, for instance, to moisture striking detector 2. Speaker 49 is connected across secondary winding 44 of transformer 41 and acts as a transducer to convert the electrical oscillations generated by oscillator 22 into an audible sound.

OPERATION

When the moisture alarm is placed in use, detector 2 which would include backing sheet 3 and its attached grid 6 and first extensions 11 and second extensions 12 is spread over the area to be protected from moisture, and cut and trimmed as necessary. This may be done by placing detector 2 across the rafters in an attic of a house, or upon a floor of a basement or other room. Oscillator circuit 22, upon connection to first conductor 8 and second conductor 9, as shown on FIG. 1 and the foregoing description of the preferred embodiment, may be placed in any location in which its signal from speaker 49 can be readily heard. Normally, because of the high impedance through grid 6, no current flows through first resistor 24 and second resistor 31 from power supply 37, nor does any current flow from collector electrode 35 of transistor 32 through the LC tank circuit of first capacitor 28 and primary winding 43. Likewise, second capacitor 26 will not pass a flow of direct current from power supply 37 through second resistor 31 to cause base electrode 34 of transistor 32 to be negative. However, when a drop of moisture falls upon detector 2 and moistens backing sheet 3, the drop is disbursed through the fibers of backing sheet 3 due to capillary action. When sufficient dispersal of the moisture has occurred, which is nearly contemporaenous with the initial wetting of backing sheet 3, the moisture bridges an interjacent space between first extensions 11 and second extensions 12. Although normally there is a very high impedance as measured between first conductor 8 and second conductor 9, the presence of moisture reduces this impedance to a predetermined value due to the conductivity of the moisture, at which reduced impedance current is able to flow between first extensions 11 and second extensions 12 and thus through first conductor 8 and second conductor 9. A series circuit is created through first conductor 8, first extensions 11, second extensions 12, second conductor 9, first resistor 24, second resistor 31, switch 36, and power supply 37.

The voltage developed across second resistor 31 causes base electrode 34 of transistor 32 to become negative and forward biases transistor 32, with the result that current begins to flow through collector electrode 35 and emitter electrode 33 of transistor 32 through the LC tank current of first capacitor 28 and primary winding 43 of transformer 41. This flow of current "shock excites" the LC tank circuit of first capacitor 28 and primary winding 43 of the LC tank circuit commences to oscillate. Those skilled in the art will recognize that once the LC tank circuit has commenced oscillation, the current flowing in the LC tank circuit alternates or reverses itself at the resonant frequency of the LC tank circuit. Unlike the direct current from power supply 37, this oscillating or alternating current is able to pass through second capacitor 26 to base electrode 34 of transistor 32. When the current is flowing through second capacitor 26 such that base electrode 34 is negative, current will flow through collector electrode 35 and into the tuned LC circuit in phase with the flow of current in the tuned circuit. However, when the current has reversed itself such that base electrode 34 is positive, then no current will flow through collector electrode 35. Thus it may be seen that the oscillating current in the tuned LC tank circuit is "fed back" to base electrode 34 of transistor 32 through second capacitor 26 which in turn either passes or blocks the flow of current through collector electrode 35 and the tuned LC circuit in step with the oscillations of the tuned LC circuit, and the oscillations of the tuned LC circuit are maintained at its resonant frequency. Transistor 32 functions as a common emitter amplifier as aforesaid to amplify the feedback oscillations sufficiently to drive speaker 49 through the secondary winding 44 of transformer 41. Additional amplification can be provided as necessary so as to drive larger speakers in the case of a sizable area of protection.

Once oscillations have commenced, regenerative feedback will be maintained through second capacitor 26, irrespective of the moisture content and resulting increase of impedance between first conductor 8 and second conductor 9 to its normal high value. In other words, once oscillations have commenced, the series circuit through first conductor 8, first extensions 11, second extensions 12, second conductor 9, first resistor 24, second resistor 31, switch 36 and power supply 37 can remain open. Second capacitor 26, by feeding back a portion of the oscillations in the tuned LC circuit to base 34 of transistor 32, is able to sustain oscillations of circuit 22. It has been observed that even after backing sheet 3 has dried out due to evaporation of moisture falling upon it at one time, circuit 22 will remain in oscillation indefinitely, limited only by the longevity of the circuit components and the power supply 37. To stop the oscillation of the circuit 22, and to reset oscillator circuit 22 to a state in which it can again detect and signal the presence of moisture, it is only necessary to open and reclose switch 36 whereby the current flow from power supply 37 is interrupted and oscillations in circuit 22 cease. Upon closing switch 36, no oscillations will occur until once again moisture is detected by detector 2.

Based upon the foregoing description, it may be seen that the present invention provides a moisture alarm system providing an audible signal when moisture has been detected. In addition, the alarm system will continue to sound its alarm even though the moisture which has been initially detected has subsequently evaporated. Finally due to the flexible nature of the textile sheet, the system is readily adaptable to a variety of configurations, and is easily resetable to a state in which it is ready to once again detect the presence of moisture.

Although but one embodiment of the present invention has been illustrated and described, it will be apparent to those skilled in the art that various changes and modifications may be made therein without departing from the spirit of the invention, and the invention is only limited as set forth in the accompanying claims.

We claim:

1. A moisture alarm system comprising:
    (a) a grid having at least two conductors, said conductors being provided with a plurality of interjacently spaced extensions conncted to said conductors, said grid further providing an impedance between said conductors which decreases in the presence of moisture;
    (b) an absorbent flexible sheet to which said grid is secured;
    (c) a regenerative oscillator circuit coupled to said conductors of said grid, said oscillator circuit being responsive to said decrease in said impedance between said conductors such that said oscillator circuit commences to oscillate at a predetermined audio frequency when said impedance decreases to a predetermined value, said oscillator including an LC tank circuit, said LC tank circuit including a first capacitor and a coil connected across said first capacitor, said coil also being a primary winding of an audio frequency transformer, said primary winding having a center tap connected to one of said conductors of said grid, said oscillator circuit further having emitter, base and collector electrodes, said emitter electrode being connected to a ground potential within said oscillator circuit, said base electrode being serially connected through resistance means to said other conductor of said grid;
    (d) a transducer for converting oscillations of said oscillating circuit to an audible sound, said transducer being coupled to a secondary winding of said transformer;
    (e) a second capacitor connected in circuit with said collector electrode, said LC tank circuit, and said base electrode for feeding back a portion of said oscillators of said circuit to said base electrode;
    (f) a direct current power source connected in circuit with said emitter electrode and said center tap of said LC tank circuit; and
    (g) switching means serially connected in circuit with said power source for interrupting a flow of current from said power source.
2. The moisture alarm system of claim 1 wherein said transistor is a PNP type.

* * * * *